United States Patent
Yatabe

(10) Patent No.: US 6,328,162 B1
(45) Date of Patent: Dec. 11, 2001

(54) CASSETTE ACCOMODATION CASE

(75) Inventor: Kazumoto Yatabe, Miyagi (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/348,274

(22) Filed: Jul. 7, 1999

(30) Foreign Application Priority Data

Jul. 9, 1998 (JP) ................................................. 10-194606

(51) Int. Cl.$^7$ ................................................. B65D 85/575
(52) U.S. Cl. ................................................. 206/387.1
(58) Field of Search .............................. 206/307, 308.1, 206/387.1, 387.15; 312/9.48

(56) References Cited

U.S. PATENT DOCUMENTS

| | | | |
|---|---|---|---|
| 3,663,492 | 5/1972 | Wallace | 260/30.2 R |
| 3,777,881 | 12/1973 | Schwartz | 206/387.1 |
| 3,876,071 | 4/1975 | Neal et al. | 206/387.1 |
| 4,011,940 | 3/1977 | Neal et al. | 206/387.1 |
| 4,067,629 | 1/1978 | Amatsu | 206/493 |
| 4,304,331 | 12/1981 | Minkow | 206/387.1 |
| 4,322,000 | 3/1982 | Struble | 206/387.1 |
| 4,365,713 | 12/1982 | Ekuan | 206/387.1 |
| 4,406,369 | 9/1983 | Wallace et al. | 206/387 |
| 4,512,470 | 4/1985 | Sieben | 206/387.1 |
| 4,555,021 * | 11/1985 | Fujii et al. | 206/387.1 |
| 4,796,753 * | 1/1989 | Fujii | 206/287.1 |
| 4,828,105 | 5/1989 | Silengo et al. | 206/387.1 |
| 4,865,195 | 9/1989 | Brands | 206/387.1 |
| 4,911,298 * | 3/1990 | Miyagawa et al. | 206/387.1 |
| 4,928,825 | 5/1990 | Hehn | 206/387.1 |
| 4,948,022 | 8/1990 | VanDyke | 206/387.1 |
| 5,038,932 * | 8/1991 | Sheu | 206/387.1 |
| 5,165,541 | 11/1992 | Morita | 206/387.1 |
| 5,282,536 | 2/1994 | Sato et al. | 206/387.1 |
| 5,373,941 | 12/1994 | Morita | 206/387.1 |
| 5,499,714 | 3/1996 | Konno | 206/387.13 |
| 5,503,272 | 4/1996 | Morita | 206/387.1 |
| 5,518,116 * | 5/1996 | Morita | 206/387.1 |
| 5,560,481 | 10/1996 | Doodson et al. | 206/387.1 |
| 5,586,654 | 12/1996 | Katagiri | 206/387.1 |
| 5,775,500 | 7/1998 | Williams | 206/387.1 |
| 5,788,068 | 8/1998 | Fraser et al. | 206/310 |
| 5,913,423 | 6/1999 | Sasaki | 206/387.12 |
| 6,009,999 | 1/2000 | Morita et al. | 206/387.13 |

FOREIGN PATENT DOCUMENTS

| | | |
|---|---|---|
| 0 493 845 | 7/1992 | (EP) . |
| 0 506 173 | 9/1992 | (EP) . |
| 0 872 841 | 10/1998 | (EP) . |
| 2 306 498 | 10/1976 | (FR) . |
| 2 508 222 | 12/1982 | (FR) . |
| 2 231 861 | 11/1990 | (GB) . |
| 98 01369 | 1/1998 | (WO) . |

* cited by examiner

Primary Examiner—Jim Foster
(74) Attorney, Agent, or Firm—Ronald P. Kananen; Rader, Fishman & Grauer PLLC

(57) ABSTRACT

In a cassette accommodation case which has a structure of inserting and taking out a cassette in a manner of sliding the cassette in a transverse direction from an insertion opening (3a;3b) formed on one side of the cassette accommodation case, the cassette is smoothly inserted thereinto and taken out thereof. A cassette supporting surface (thick wall portion 1a) on an inner surface side of the cassette accommodation case is formed into a knurling surface so as to reduce a frictional resistance when inserting the cassette in the cassette accommodation case and taking it out thereof.

6 Claims, 6 Drawing Sheets

F I G. 8
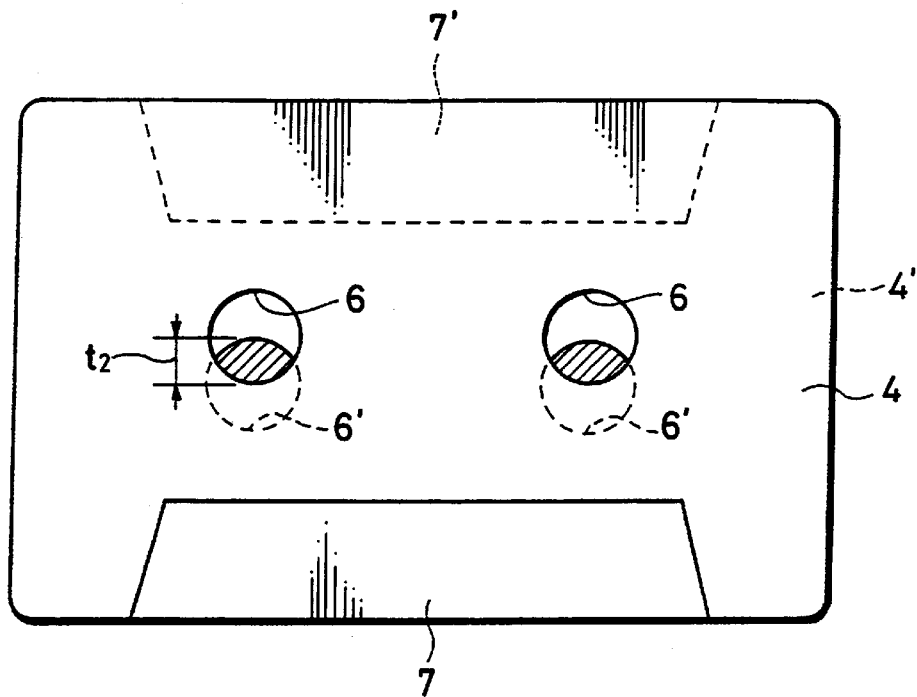
F I G. 9
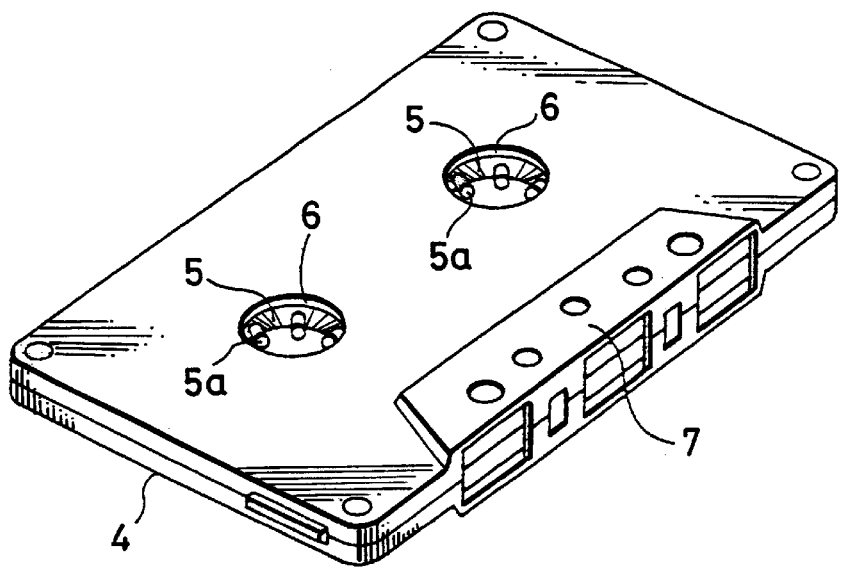

CASSETTE ACCOMODATION CASE

BACKGROUND OF THE INVENTION

1. Field of the Invention

The present invention relates to a cassette (storage) case which is suitable for inserting and accommodating a tape cassette such as an audio compact cassette or the like, and in particular, to a slide type cassette accommodation case which can insert and take out a cassette in a manner of sliding the cassette in a transverse direction from an insertion opening formed on one side of the cassette accommodation case.

2. Description of the Related Art

In recent years, in a cassette accommodation case for inserting and accommodating an audio compact cassette, a slide type cassette accommodation case has been practically used which slidably inserts and takes out a cassette in a manner of sliding the cassette in a transverse direction from an insertion opening formed on one side of the cassette accommodation case.

FIG. 1 to FIG. 4 each show a structure of a conventional slide type cassette accommodation case.

The cassette accommodation case is constructed in a manner of combining a lower half 1 and an upper half 2. The lower half 1 is a plastic molding product which is molded of e.g., a HIPS (high impact polystyrene) material; on the other hand, the upper half 2 is a plastic molding product which is molded of e.g., a GPPS (general purpose polystyrene) material.

The lower half 1 and the upper half 2 are individually formed with half-cut like cassette insertion openings 3a and 3b at their one side, and a cassette (audio compact cassette) 4 shown in FIG. 9 is slidably inserted in and taken out of the insertion opening in a transverse direction.

The cassette 4 rotatably houses therein a pair of reel hubs 5 for winding up a magnetic tape, and an inner periphery of the reel hub 5 corresponds to each of a pair of hub driving shaft insertion holes 6 formed on a cassette housing body.

Also, one side of the cassette 4 is formed with a trapezoidal bulged portion 7 which constitutes a mouth portion where the magnetic tape is exposed, at both upper and lower sides of the cassette housing body.

The cassette 4 is inserted into the cassette accommodation case so that there is almost no gap. To this end, in an interior of the cassette accommodation case, on inner surfaces of the lower half 1 and the upper half 2 are formed with recess grooves 8a and 8b for receiving the bulged portion 7 of the cassette 4 in a transverse direction, that is, a cassette inserting direction, respectively.

The inner surface of the lower half 1 is fixed and attached with a rotation stopper member 9 for inhibiting an unnecessary rotation of the reel hub 5 of the cassette 4.

The rotation stopper member 9 is molded of a PP (polypropylene) resin, and is composed of a base plate 10 having a plurality of caulking holes 10a, and a pair of rotation stopper pieces 11 which stand up integrally from the base plate 10 and are elastically deformable. A distance between these rotation stopper pieces 11 corresponds to a distance between the hub driving shaft insertion holes 6 of the cassette 4.

Moreover, the rotation stopper piece 11 is formed with a notch 12 which reaches an upper surface of the base plate 10 at the center thereof, and thereby, the rotation stopper piece 11 is composed of two pieces 11a and 11b. The base plate 10 is formed with a U-shaped notch groove 13 around the rotation stopper piece 11.

The inner surface of the lower half 1, on which the rotation stopper member 9 is fixed, is formed a thin wall portion 1b for weight reduction in a state of leaving the recess groove 8a, the insertion opening 3a and a U-shaped thick wall portion 1a along a side wall 1d. The thin wall portion 1b is formed with a rib 16 having a shape surrounding a periphery of the base plate 10 of the rotation stopper member 9, and then, the base plate 10 is positioned by the rib 16.

The rib 16 is formed lower than the thick wall portion 1a, and a caulking pin 17 corresponding to the fastening hole 10a of the base plate 10 is projected from the thin wall portion 1b surrounded by the rib 16. Then, in a state that the fastening pin 17 is engaged with the fastening hole 10a of the base plate 10, the tip end portion of the fastening pin 17 is subjected to caulking by ultrasonic welding or the like, and thus, the rotation stopper member 9 is fixed on the thin wall portion 1b surrounded by the rib 16.

Further, the thin wall portion 1b surrounded by the rib 16 is formed with a receiving recess portion 14 corresponding to the notch groove 13 of the base plate 10, and a depth of the recess portion 14 is 0.4 mm, for example.

An inner surface of the lower half 1 is provided with a slip-off preventive member 18 for preventing the cassette 4 from slipping off from the cassette accommodation case in a state that the cassette 4 is housed therein.

The slip-off preventive member 18 is projectingly formed integrally with the lower half 1, and has an engaging protrusion 19 at its tip end portion. When the cassette 4 is housed in the cassette accommodation case, the engaging protrusion 19 of this slip-off preventive member 18 is engaged with a hole 4c formed in an erroneous erase preventive detection pawl 4b provided at a rear face portion 4a of the cassette 4, as shown in FIG. 3, and thereby, the cassette 4 is prevented from slipping off from the cassette accommodation case.

On the other hand, like the lower half 1, an inner surface of the upper half 2 is formed with a thin wall portion 2b for weight reduction in a state of leaving the recess groove 8b, the insertion opening 3b and a U-shaped thick wall portion 2a along a side wall 2d. The thin wall portion 2b is formed with a long window-like opening portion 20 in a depth direction at the substantially central portion of the upper half 2. In the case of taking out the cassette 4 housed in the cassette accommodation case, a user pushes out the cassette 4 by his finger through the opening portion 20.

Further, the thin wall portion 2b is formed with a rib 21 along a peripheral edge of the opening portion 20, and thereby, it is possible to improve a strength of the upper half 2 and hence to prevent its flexion. Also, the rib 21 is formed lower than the thick wall portion 2a.

Moreover, in order to readily assemble the lower half 1 and the upper half 2, the lower half 1 and the upper half 2 are both provided with positioning means.

The positioning means is as follows. As shown in FIGS. 1 & 2, on the lower half 1 side, positioning protrusions 15a and 15b are projected at both right and left sides on an inner side of a depth wall 1c; on the other hand, on the upper half 2 side, a positioning protrusion 15c is projected at the substantially central portion on an inner side of a depth wall 2c. In this case, the positioning protrusions 15a and 15b are formed higher than the depth wall 1c, side walls 1d and 1e of the lower half 1. Likewise, the positioning protrusions 15c is formed higher than the depth wall 2c, side walls 2d and 2e of the upper half 2. These positioning protrusions are formed with an inclined plane for positioning at their tip ends.

In the case of assembling the cassette accommodation case, the lower half 1 and the upper half 2 are combined with the use of the aforesaid positioning protrusions 15a, 15b and 15c, and then, their joint surface is fixed by ultrasonic welding or the like so that these upper and lower halves 1 and 2 are integrally combined.

When the cassette 4 is inserted into the cassette accommodation case constructed as described above, the bulged portion 7 of the cassette 4 is guided by the recess grooves 8a and 8b formed in the lower half 1 and the upper half 2, while upper and lower faces other than the bulged portion 7 of the cassette 4 are guided by the thick wall portions 1a and 2a of the lower half 1 and the upper half 2.

With the cassette inserting operation, the rotation stopper protrusion 11 of the rotation stopper member 9 initially falls in the receiving recess portion 14 of the lower half 1 by the notch groove 13 formed in the base plate 10, and thereafter, is elastically deformed in a manner of being pushed down by the end portion of the cassette 4. In this case, by the provision of the receiving recess portion 14, a load to the rotation stopper protrusion 11 by the cassette 4 is dispersed to two points, that is, a proximal portion and a slightly upward portion of the rotation stopper protrusion 11. Thus the load by the cassette 4 is reduced, and a durability of the rotation stopper protrusion 11 is increased while the rotation stopper protrusion 11 is readily and securely elastically returned to the original state.

Thereafter, when the cassette 4 is inserted into the deepest portion of the cassette accommodation case, the rotation stopper protrusion 11 corresponds to the hub driving shaft insertion hole 6 of the cassette 4, and thereby, the rotation stopper protrusion 11 is elastically returned and then, stands up so as to be engaged with the engaging protrusion 5a formed on the inner periphery of the reel hub 5, and thus, an unnecessary rotation of the reel hub 5 can be inhibited.

In a state that the cassette 4 is housed in the cassette accommodation case, the bulged portion 7 of the cassette 4 is held in the recess grooves 8a and 8b formed in the lower half 1 and the upper half 2 while upper and lower faces other than the bulged portion 7 of the cassette 4 being held in the thick wall portions 1a and 2a of the lower half 1 and the upper half 2.

Further, in a state that the cassette 4 is housed in the cassette accommodation case, as shown in FIG. 3, the engaging protrusion 19 of the slip-off preventive member 18 is engaged with the hole 4c formed in the erroneous erase preventive detection pawl 4b provided at the rear face portion 4a of the cassette 4, and thereby, the cassette 4 can be stably stored in the cassette accommodation case without slipping off the cassette accommodation case.

In the case of taking out the cassette 4 from the cassette accommodation case, the user pushes out the cassette 4 by his finger through the opening portion 20 of the upper half 2, and then, the cassette 4 is pushed out to some degree, and thereafter, the user grasps the cassette 4 by his hand so as to pull it out of the cassette accommodation case.

In a cassette take-out operation, the rotation stopper protrusion 11 of the rotation stopper member 9 is elastically deformed so as to be pressed down in a side opposite to the side when the cassette is inserted, and then, comes off the hub driving shaft insertion hole 6. Then, after the cassette is taken out, the rotation stopper protrusion 11 is again elastically returned to the original state of standing up.

As described above, in the conventional cassette accommodation case, when inserting and taking out the cassette, a great frictional force is generated between the inner surface of the cassette accommodation case and the cassette. For this reason, it is difficult to smoothly insert and take out the cassette; therefore, there is arisen a problem that the user has difficulty handling the conventional cassette accommodation case.

SUMMARY OF THE INVENTION

The present invention has been made taking the aforesaid problem in the prior art into consideration. It is, therefore, an object of the present invention to provide a cassette accommodation case which can reduce a frictional resistance between an inner surface of the cassette accommodation case and a cassette, and can smoothly insert the cassette in the cassette accommodation case and take it out thereof.

To achieve the above object, the present invention provides a cassette accommodation case which has a structure of inserting and taking out a cassette in a manner of sliding the cassette in a transverse direction from an insertion opening formed on one side of the cassette accommodation case, wherein a cassette supporting surface on an inner surface side of the cassette accommodation case is formed into a knurling surface.

With the above construction, it is possible to reduce a frictional resistance when inserting the cassette in the cassette accommodation case and taking it out thereof, so that the cassette can be smoothly inserted thereinto and taken out thereof.

BRIEF DESCRIPTION OF THE DRAWINGS

FIG. 8 is a view to explain a state of two cassettes overlap in a direction reverse to each other; and FIG. 9 is a perspective view showing a cassette (audio compact cassette).

DETAILED DESCRIPTION OF THE PREFERRED EMBODIMENT

Figure 1:
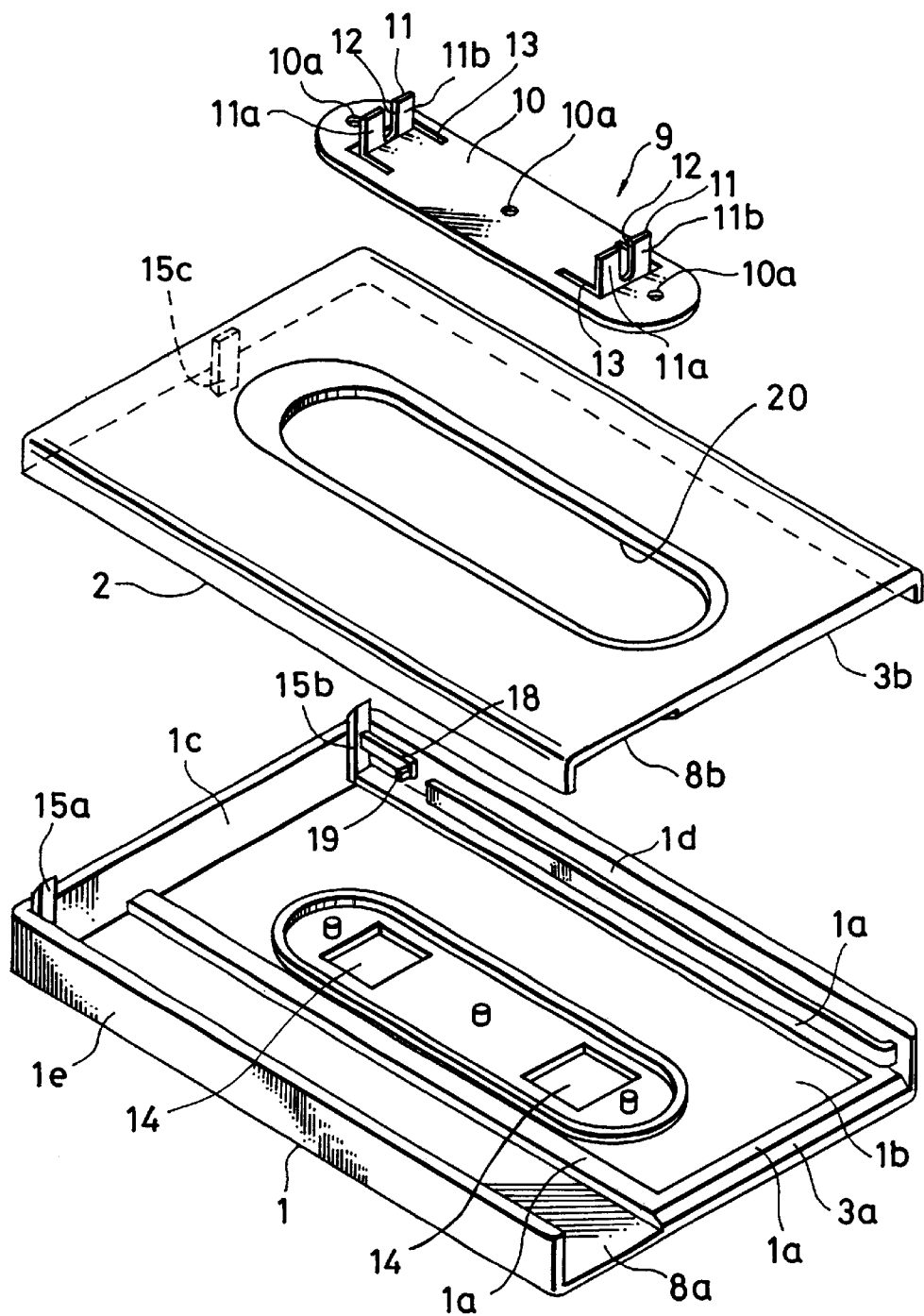
FIG. 1 is an exploded perspective view showing a conventional cassette accommodation case.
Figure 2:
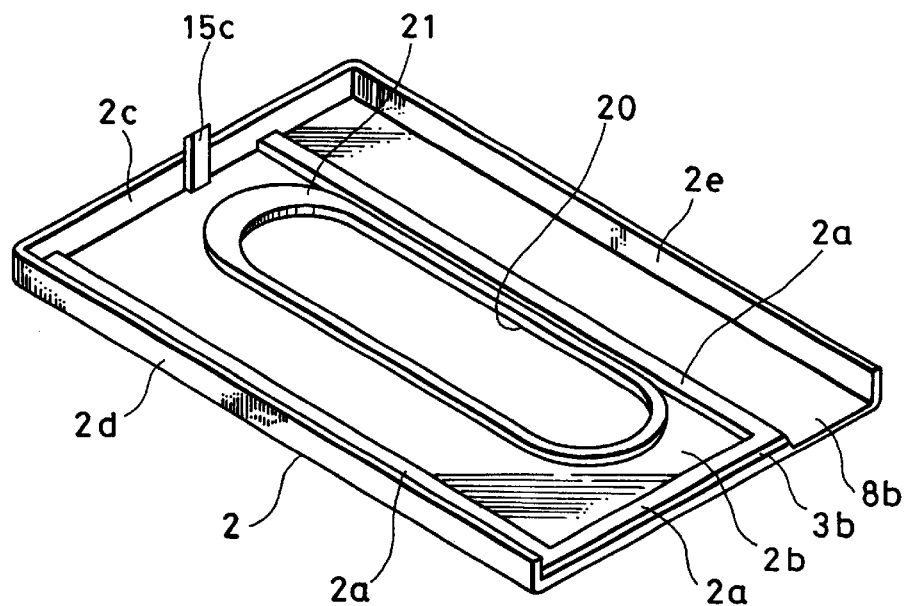
FIG. 2 is a perspective view showing a backside of an upper half of the conventional cassette accommodation case.

A preferred embodiment of the present invention will be described below in detail with reference to the accompanying drawings, that is, FIG. 5 to FIG. 9.

A cassette accommodation case of this embodiment has basically the same structure as that shown in the conventional cassette accommodation case.

More specifically, a cassette accommodation case of the present invention is constructed in a manner of combining a lower half 1 and an upper half 2. In this case, the lower half 1 is a plastic molding product which is molded of e.g., a HIPS (high impact polystyrene) material; on the other hand, the upper half 2 is a plastic molding product which is molded of e.g., a GPPS (general purpose polystyrene) material.

The lower half 1 and the upper half 2 are individually formed with half-cut like cassette insertion openings 3a and 3b at their one side, and a cassette (audio compact cassette) 4 as shown in FIG. 9 is slidably inserted from the insertion opening and taken out therefrom in a transverse direction.

The cassette 4 rotatably houses therein a pair of reel hubs 5 for winding up a magnetic tape, and an inner periphery of the reel hub 5 corresponds to each of a pair of hub driving shaft insertion holes 6 formed on a cassette housing body.

Also, one side of the cassette 4 is formed with a trapezoidal bulged portion 7 which constitutes a mouth portion through which the magnetic tape is exposed, and is bulged at both upper and lower sides of the cassette housing body.

The cassette 4 is housed in the cassette accommodation case so that there is almost no gap. To this end, in an interior of the cassette accommodation case, inner surfaces of the lower half 1 and the upper half 2 are formed with recess grooves 8a and 8b for receiving the bulged portion 7 of the cassette 4 in a transverse direction, that is, a cassette inserting direction, respectively.

In the cassette accommodation case of the present embodiment, these recess grooves 8a and 8b are symmetrically formed on both right and left sides in the cassette inserting direction. Thus, the cassette 4 can be inserted in the cassette accommodation case from whichever orientations or directions, that is, even in the case where the cassette 4 is situated on the cassette inserting direction left side and on the cassette inserting direction right side.

The inner surface of the lower half 1 is fixed and attached with a rotation stopper member 9 for inhibiting an unnecessary rotation of the reel hub 5 of the cassette 4.

The rotation stopper member 9 is molded of a PP (polypropylene) resin, and is composed of a base plate 10 having a plurality of caulking holes 10a, and a pair of rotation stopper pieces 11 which stand up integrally from the base plate 10 and are elastically deformable. A distance between these rotation stopper pieces 11 corresponds to a distance between the hub driving shaft insertion holes 6 of the cassette 4.

Moreover, the base plate 10 is formed with a U-shaped notch groove 13 around the rotation stopper piece 11.

In the cassette accommodation case of the present embodiment, the rotation stopper protrusions 11 are located so as to be situated on the central line of the cassette inserting direction. In this case, a width $t_1$ of the rotation stopper protrusion 11 is equal substantially to a width $t_2$ of a communicating portion (shown by a slant line) of the hub driving shaft insertion holes 6 and 6' when two cassette 4 and 4' overlap in a direction reverse to each other, or is slightly smaller than the width $t_2$, as shown in FIG. 8.

Thus, in a state that the cassette 4 is housed in the cassette accommodation case, even in the case where the cassette 4 is inserted thereinto from any direction, the rotation stopper protrusion 11 is inserted into the hub driving shaft insertion hole 6 so as to be engaged with the reel hub 5.

The inner surface of the lower half 1, on which the rotation stopper member 9 is fixed, is formed with a thin wall portion 1b for weight reduction in a state of leaving the recess grooves 8a at both sides of the lower half 1, and a U-shaped thick wall portion 1a along the insertion opening 3a. The thin wall portion 1b is formed with a rib 16 having a shape surrounding a periphery of the base plate 10 of the rotation stopper member 9, and then, the base plate 10 is positioned by the rib 16.

The rib 16 is formed lower than the thick wall portion 1a, and a caulking pin 17 corresponding to the caulking hole 10a of the base plate 10 is projected from the thin wall portion 1b surrounded by the rib 16. Then, in a state that the caulking pin 17 is engaged with the caulking hole 10a of the base plate 10, the tip end portion of the fastening pin 17 is subjected to caulking by ultrasonic welding or the like, and thus, the rotation stopper member 9 is fixed on the thin wall portion 1b surrounded by the rib 16.

Further, the thin wall portion 1b surrounded by the rib 16 is formed with a receiving recess portion 14 corresponding to the notch groove 13 of the base plate 10, and a depth of the recess of recess portion 14 is made as 0.4 mm, for example.

In the inner surface of the lower half 1, according to the present embodiment, in particular, a surface of the thick wall portion 1a for supporting the cassette is formed into a knurling surface.

Moreover, the inner surface of the lower half 1 is provided with a slip-off preventive member 18 for preventing the cassette 4 from slipping off from the cassette accommodation case in a state that the cassette 4 is housed therein.

Figure 7:
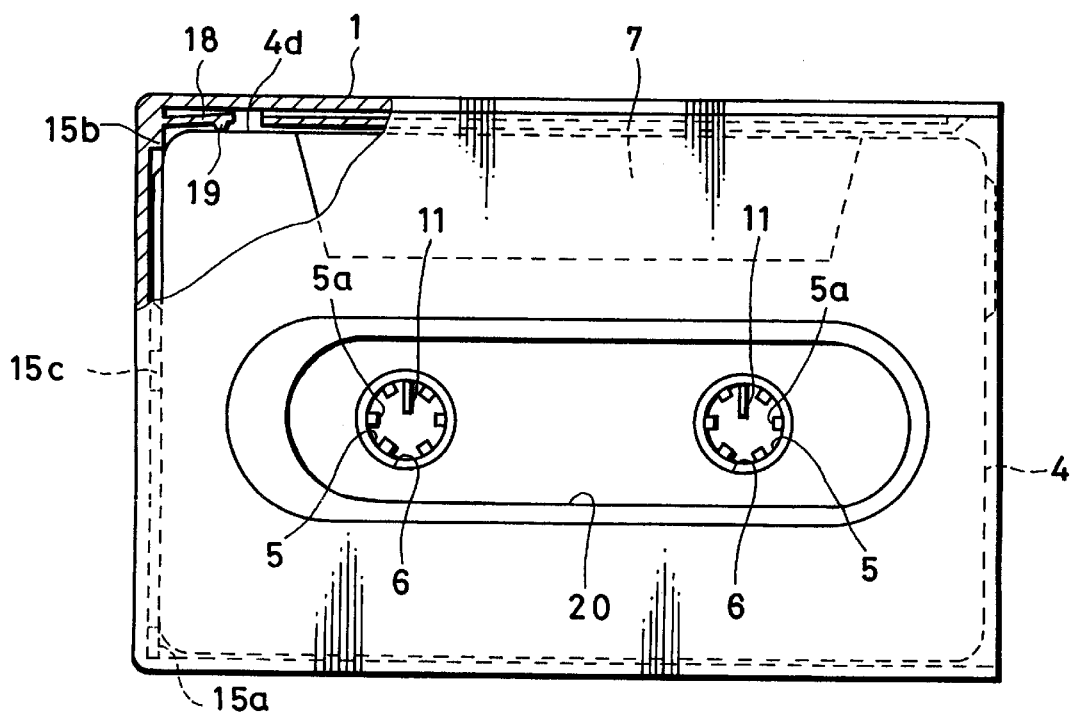
FIG. 7 is a plan view partly in section showing a state that a cassette is housed in the cassette accommodation case of the invention.

The slip-off preventive member 18 is projectingly formed integrally on the lower half 1, and has an engaging protrusion 19 at its tip end portion. When the cassette 4 is housed in the cassette accommodation case, the engaging protrusion 19 of the slip-off preventive member 18 presses down the front face portion 4d of the cassette 4, as shown in FIG. 7, and thereby, the cassette 4 is prevented from slipping off from the cassette accommodation case.

On the other hand, like the lower half 1, an inner surface of the upper half 2 is formed with a thin wall portion 2b for weight reduction in a state of leaving the recess grooves 8b at both sides of the upper half 2, and a U-shaped thick wall portion 2a along the insertion opening 3b. The thin wall portion 2b is formed with a long window-like opening portion 20 in a depth direction at the substantially central portion on the upper half 2. In the case of taking out the cassette 4 housed in the cassette accommodation case, a user pushes out the cassette 4 by his finger through the opening portion 20.

Further, the thin wall portion 2b is formed with a rib 21 along a peripheral edge of the opening portion 20, and the rib 21 is formed lower than the thick wall portion 2a. Thus, it is possible to improve strength of the upper half 2 and hence to prevent its flexion.

In the inner surface of the upper half 2, a surface of the thick wall portion 2a for supporting the cassette is formed into a knurling surface. Likewise, the lower half 1, has a similar surface 1a *FIG. 5.*).

Moreover, in order to readily assemble the lower half 1 and the upper half 2, the lower half 1 and the upper half 2 are both provided with positioning means.

Figure 5:
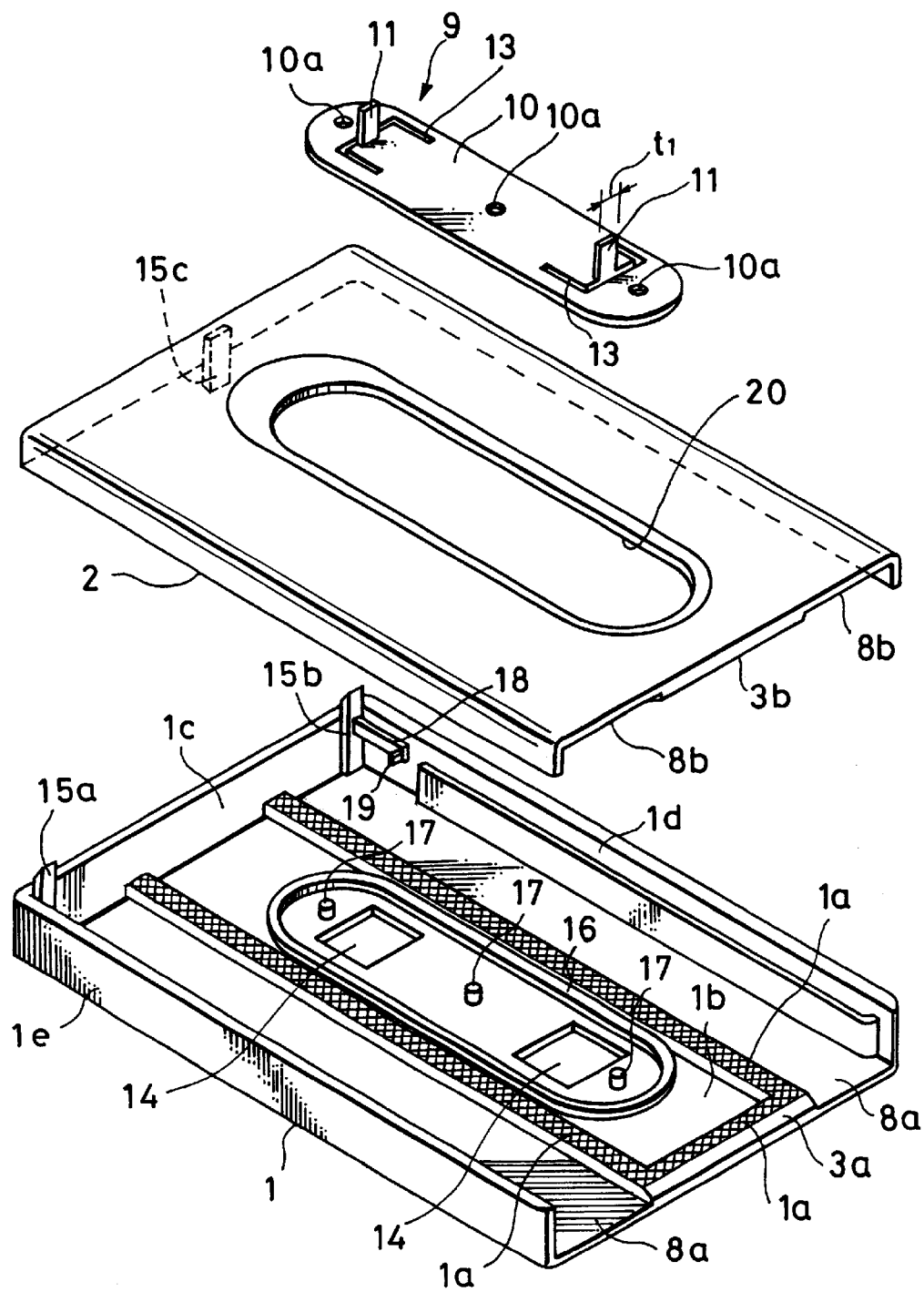
FIG. 5 is an exploded perspective view showing a cassette accommodation case according to the present invention.
Figure 6:
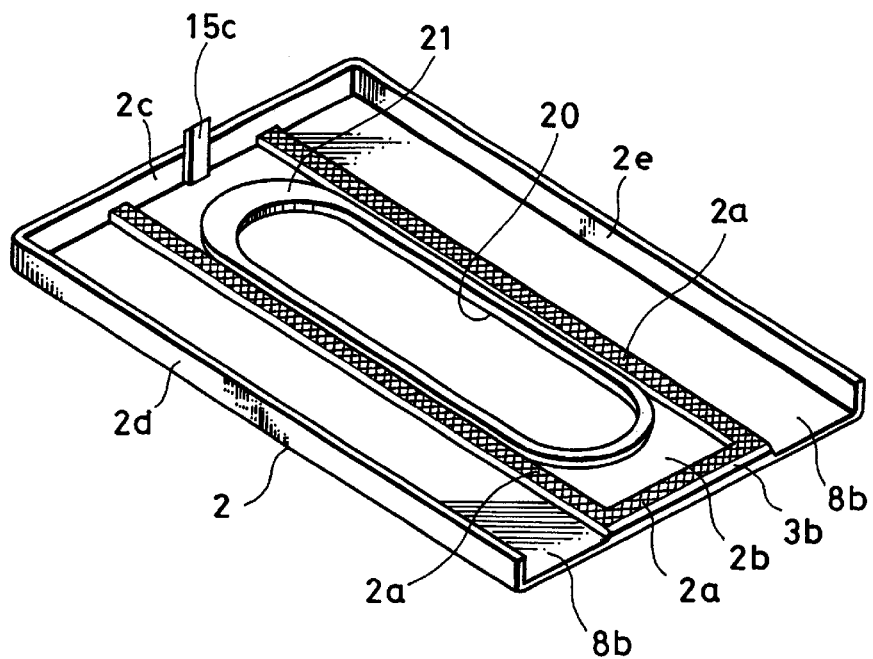
FIG. 6 is a perspective view showing a backside of an upper half of the cassette accommodation case of the invention.

The positioning means is as follows. As shown in FIGS. 5 and 6 in the lower half 1 side, positioning protrusions 15a and 15b are projected at both right and left sides on an inner side of a depth wall 1c; on the other hand, in the upper half 2 side, a positioning protrusion 15c is projected at the substantially central portion on an inner side of a depth wall 2c. In this case, the positioning protrusions 15a and 15b are formed higher than the depth wall 1c, side walls 1d and 1e of the lower half 1. Likewise, the positioning protrusion 15c is formed higher than the depth wall 2c, side walls 2d and 2e of the lower half 1. These positioning protrusions are formed with an inclined plane for positioning at their tip ends.

In the case of assembling the cassette accommodation case, the lower half 1 and the upper half 2 are combined with the use of the aforesaid positioning protrusions 15a, 15b and 15c, and then, their joint surface is fixed by ultrasonic welding or the like so that these upper and lower halves 1 and 2 are integrally combined.

When the cassette 4 is inserted into the cassette accommodation case constructed as described above, the bulged portion 7 of the cassette 4 is guided to the recess grooves 8a and 8b formed in the lower half 1 and the upper half 2, while upper and lower faces other than the bulged portion 7 of the cassette 4 are guided by the thick wall portions 1a and 2a of the lower half 1 and the upper half 2.

In the cassette accommodation case of the present embodiment, these recess grooves 8a and 8b are symmetrically formed on both right and left sides in the cassette inserting direction, and thereby, the cassette 4 can be inserted in the cassette accommodation case from any direction. Thus, the user has no need of confirming a direction of the cassette every time when inserting the cassette, and therefore, can smoothly insert the cassette into the cassette accommodation case in one motion even in a dark place.

In the cassette inserting operation, each surface of the thick wall portions 1a and 2a of the lower half 1 and the upper half 2, which is a cassette supporting face, is formed into a knurling surface, and thereby, it is possible to smoothly insert the cassette with low frictional resistance.

More specifically, the knurling surface is a non-flat surface having macroscopically fine convexity and concavity; for this reason, a contact area to the cassette is smaller as compared with a flat surface. Thus, it is possible to reduce a frictional resistance by that extent, and to smoothly insert the cassette in the cassette accommodation case.

With the cassette inserting operation, the rotation stopper protrusion 11 of the rotation stopper member 9 initially falls in the receiving recess portion 14 of the lower half 1 by the notch groove 13 formed in the base plate 10 thereafter once the cassette 4 is secure within the case, protrusion 11 is elastically deformed being pushed down by the end portion of the cassette 4. In this case, a load by the cassette 4 to the rotation stopper protrusion 11 is dispersed at two points, that is, a proximal portion and a slightly upward portion of the rotation stopper protrusion 11 by the provision of receiving recess portion 14. Thus the load by the cassette 4 is reduced, and a durability of the rotation stopper protrusion 11 is increased while the rotation stopper protrusion 11 is readily and securely elastically returned to the original state.

Thereafter, when the cassette 4 is inserted into the deepest portion of the cassette accommodation case, the rotation stopper protrusion 11 corresponds to the hub driving shaft insertion hole 6 of the cassette 4, and thereby, the rotation stopper protrusion 11 is elastically returned and then, stands up so as to be engaged with the engaging protrusion 5a formed on the inner periphery of the reel hub 5, and thus, an unnecessary rotation of the reel hub 5 can be inhibited.

In a state that the cassette 4 is housed in the cassette accommodation case, the bulged portion 7 of the cassette 4 is held in the recess grooves 8a and 8b formed in the lower half 1 and the upper half 2 while upper and lower faces other than the bulged portion 7 of the cassette 4 being held by the thick wall portions 1a and 2a of the lower half 1 and the upper half 2.

Figure 3:
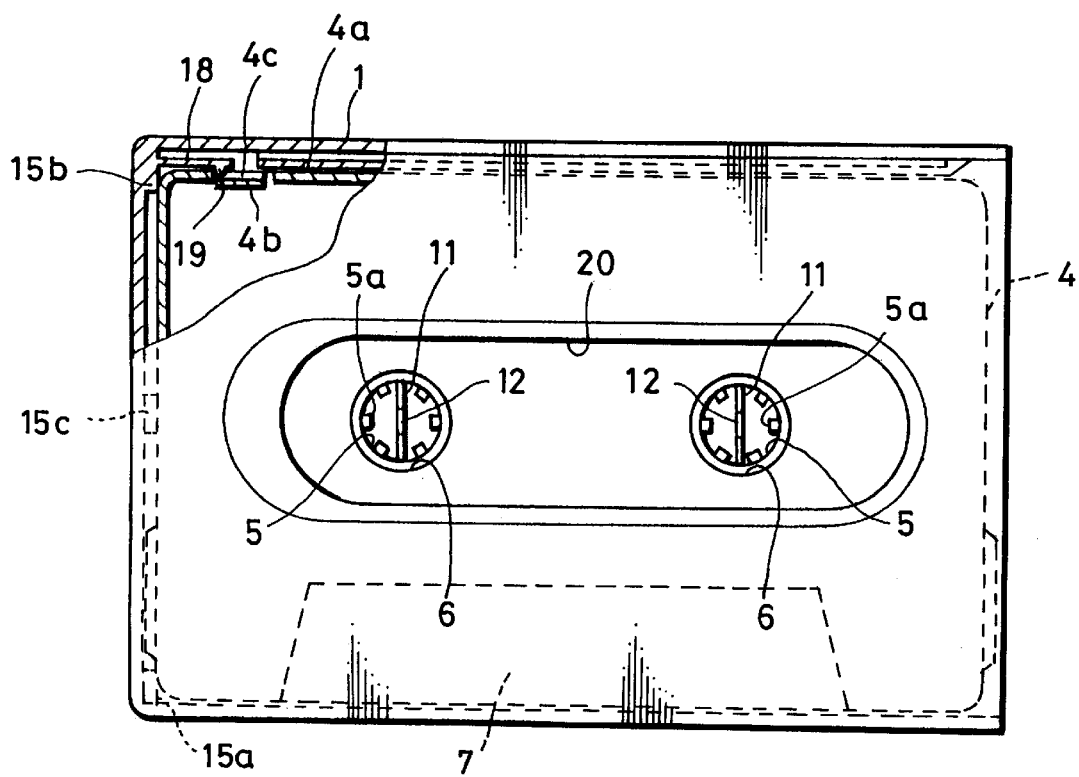
FIG. 3 is a plan view partly in section showing a state that a cassette is housed in the conventional cassette accommodation case.
Figure 4:
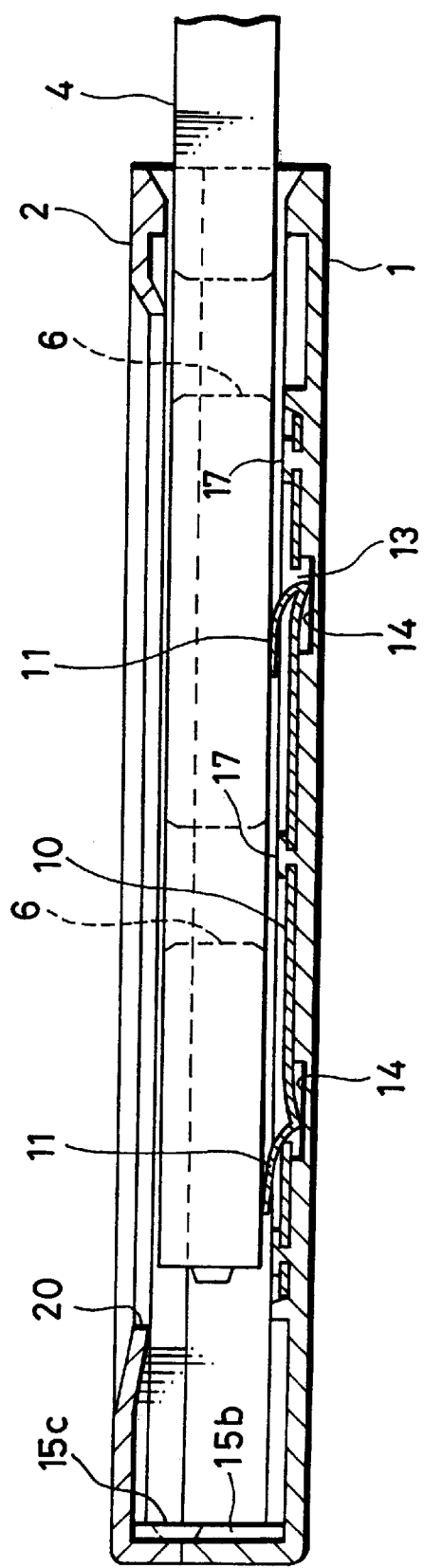
FIG. 4 is a longitudinal cross-sectional view showing a state that the cassette is inserted into the conventional cassette accommodation case.

Further, in a state that the cassette 4 is housed in the cassette accommodation case, as shown in FIG. 3, the engaging protrusion 19 of the slip-off preventive member 18 is engaged with the hole 4c formed in the erroneous erase preventive detection pawl 4b provided at the rear face portion 4a of the cassette 4, and thereby, the cassette 4 can be stably stored in the cassette accommodation case without slipping off from the cassette accommodation case.

Depending upon the direction of the cassette 4, as shown in FIG. 7, the slip-off preventive member 18 is elastically deformed so as to be released from the cassette 4, and then, the engaging protrusion 19 presses down the front face portion 4d of the cassette 4 so that the cassette 4 is prevented from slipping off.

In the case of taking out the cassette 4 from the cassette accommodation case, the user pushes out the cassette 4 by his finger through the opening portion 20 of the upper half 2, and then, the cassette 4 is pushed out to some degree, and thereafter, the user grasps the cassette 4 by his hand so as to pull it out.

In the cassette take-out operation, each surface of the thick wall portions 1a and 2a of the lower half 1 and the upper half 2, which is a cassette supporting face, is formed into a knurling surface, and thereby, it is possible to smoothly take out the cassette 4 with a low frictional resistance.

In a cassette take-out operation, the rotation stopper protrusion 11 of the rotation stopper member 9 is elastically deformed so as to be pressed down in a side opposite to the side when the cassette is inserted, and then, comes off the hub driving shaft insertion hole 6. Then, after the cassette is taken out, the rotation stopper protrusion 11 is again elastically returned to the original state of standing up.

As is evident from the above explanation, according to the present invention, in a cassette accommodation case which has a structure of inserting and taking out a cassette in a manner of sliding the cassette in a transverse direction from an insertion opening formed on one side of the cassette accommodation case, since a cassette supporting surface on an inner surface side of the cassette case is formed into a knurling surface, the cassette is smoothly inserted therein and taken out thereof, and thereby, it is possible to reduce frictional resistance when inserting the cassette in the cassette accommodation case and taking it out thereof. Therefore, the present invention can provide a slide type cassette accommodation case which is easy to handle for a user.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A cassette accommodation case, comprising:
   upper and lower portions individually formed with cassette insertion openings so that the cassette is slidably inserted therebetween in a direction transverse to said openings, wherein each portion has a cassette receiving recess,
   said lower portion further having an inner surface,
   said inner surface having a thin wall portion, wherein said thin wall portion is formed with a rib along a peripheral edge of said opening portion, said cassette receiving recesses each having a thick wall portion, said rib being formed lower than said thick wall portions, wherein each thick wall portion is formed into a non-flat knurled surface having a macroscopically fine convexity and concavity.

2. A cassette accommodation case as described in claim 1, further comprising:

said thin wall portion being formed to reduce weight of said lower portion.

3. A cassette accommodation case as described in claim 1, further comprising:

said lower portion having a slip-off preventive member projectingly formed integrally in a one piece unitary fashion therein, and slip-off preventive member being elastically deformed so that, during withdrawal of the cassette from said case, said preventive member is released and does not inhibit withdrawal.

4. A cassette accommodation case as described in claim 3, further comprising:

wherein said slip-off preventive member further has an engaging protrusion which, while the cassette is within said case, presses down on the cassette thereby preventing slippage.

5. A cassette accommodation case as described in claim 4, further comprising:

said thin wall portion having a rotation stopper member affixed thereto, said rotation stopper having a base plate and a protrusion, said rotation stopper protrusion located in a receiving recess portion of said lower portion by a notch groove formed in said base plate, so that when the cassette is secure within the case, said protrusion is elastically deformed by pressure from end portions of the cassette, whereby said pressure is dispersed over at least two points, comprising a proximal point and also a slightly upward portion of said protrusion.

6. A cassette accommodation case as described in claim 5, further comprising:

said rotation stopper protrusion is located on the central line of a cassette inserting direction, and have width sufficiently small to accommodate a reel hub of the cassette regardless of which way the cassette is inserted.

\* \* \* \* \*